United States Patent
Kang et al.

(10) Patent No.: US 11,398,316 B2
(45) Date of Patent: Jul. 26, 2022

(54) SPARGER FOR REDUCING THE CONCENTRATION OF RADIOACTIVE MATERIALS AND NUCLEAR POWER PLANT HAVING THE SAME

(71) Applicant: KOREA ATOMIC ENERGY RESEARCH INSTITUTE, Daejeon (KR)

(72) Inventors: Kyungjun Kang, Iksan-si (KR); Moon Jung, Daejeon (KR); Jihan Chun, Daejeon (KR); Hanok Kang, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 36 days.

(21) Appl. No.: 16/997,449

(22) Filed: Aug. 19, 2020

(65) Prior Publication Data

US 2021/0057116 A1    Feb. 25, 2021

(30) Foreign Application Priority Data

Aug. 20, 2019    (KR) .................... 10-2019-0101918

(51) Int. Cl.
| | |
|---|---|
| *G21C 13/10* | (2006.01) |
| *G21C 15/18* | (2006.01) |
| *B05B 1/02* | (2006.01) |
| *B05B 1/14* | (2006.01) |

(Continued)

(52) U.S. Cl.
CPC .......... *G21C 13/10* (2013.01); *B01F 35/7179* (2022.01); *B05B 1/02* (2013.01);
(Continued)

(58) Field of Classification Search
CPC ...... G21C 15/18; G21C 19/303; G21C 13/10; B01F 15/0254; B01F 2001/0044;
(Continued)

(56) References Cited

U.S. PATENT DOCUMENTS

2015/0221403 A1* 8/2015 Kim ................ G21C 9/004
                                                    376/203

FOREIGN PATENT DOCUMENTS

| BG | 3247580 A1 * 12/1981 | ............. G21C 9/012 |
|---|---|---|
| JP | 2013116441 A   6/2013 | |

(Continued)

*Primary Examiner* — Darlene M Ritchie
(74) *Attorney, Agent, or Firm* — Scully Scott Murphy and Presser (57) ABSTRACT

A sparger includes a main pipe connecting inside and outside of a water tank having a storage space therein for storing cooling water, so as to define a flow path through which steam and air containing radioactive materials generated outside the water tank are discharged into the cooling water, a header part connected to one end portion of the main pipe located in the storage space, and having a storage chamber in which the steam and air transferred through the main pipe are collected, and a plurality of discharge nozzles disposed in a spacing manner, each having inlet and outlet formed on one end located in the storage chamber and another end located in the storage space, respectively, to discharge the steam and air from the storage chamber to the storage space, and at least some of the plurality of discharge nozzles protruding from the header part by different lengths.

9 Claims, 5 Drawing Sheets

(51) Int. Cl.
  *B05B 3/18*      (2006.01)
  *G21C 19/303*    (2006.01)
  *G21F 9/02*      (2006.01)
  *B01F 35/71*     (2022.01)
  *G21F 9/00*      (2006.01)
  *B01F 21/00*     (2022.01)
  *B01F 101/57*    (2022.01)

(52) U.S. Cl.
  CPC ............... *B05B 1/14* (2013.01); *B05B 3/18* (2013.01); *G21C 15/18* (2013.01); *G21C 19/303* (2013.01); *G21F 9/008* (2013.01); *G21F 9/02* (2013.01); *B01F 21/40* (2022.01); *B01F 2101/57* (2022.01)

(58) Field of Classification Search
  CPC .... B01F 2215/0095; G21F 9/02; G21F 9/007; G21F 9/008; Y02E 30/30; B05B 1/02; B05B 1/14; B05B 3/18

USPC .......................................... 376/308–314, 316
  See application file for complete search history.

(56) References Cited

FOREIGN PATENT DOCUMENTS

| | | |
  |---|---|---|
  | KR | 100572046 B1 | 4/2006 |
  | KR | 100893680 B1 | 4/2009 |
  | KR | 101089103 B1 | 12/2011 |
  | KR | 101205390 B1 | 11/2012 |
  | KR | 1020160139024 A | 12/2016 |
  | KR | 10-2018-0057309 A | 5/2018 |
  | KR | 10-2018-0103373 A | 9/2018 |
  | KR | 101953954 B1 | 3/2019 |
  | WO | WO-2015153192 A1 * 10/2015 .............. B01J 4/004 |

* cited by examiner

SPARGER FOR REDUCING THE CONCENTRATION OF RADIOACTIVE MATERIALS AND NUCLEAR POWER PLANT HAVING THE SAME

CROSS-REFERENCE TO RELATED APPLICATION

Pursuant to 35 U.S.C. § 119(a), this application claims the benefit of the earlier filing date and the right of priority to Korean Patent Application No. 10-2019-0101918, filed on Aug. 20, 2019, the contents of which is incorporated by reference herein in its entirety.

BACKGROUND

1. Technical Field

The present disclosure relates to a sparger for discharging and removing radioactive materials contained in steam and air generated during a nuclear accident, and a nuclear power plant having the same.

2. Description of the Related Art

As one of components of a radioactive material reduction facility to reduce the concentration of radioactive materials that are discharged and diffused into a containment building by a passive force in the event of a nuclear accident, a sparger by which steam and air containing radioactive materials discharged from a reactor into a refueling tank are bubbled in small size is provided. The bubbles discharged from the sparger come into contact with cooling water stored in the refueling tank, and the radioactive materials are removed while being dissolved by the cooling water.

In the case of the related art sparger, when a flow rate of steam discharged into the refueling tank is large, the sparger causes a jet flow such that condensation of the discharged steam occurs outside the sparger. However, when the flow rate of the steam decreases over time, the jet flow of the sparger decreases and accordingly the condensation of the discharged steam occurs inside the sparger. If the condensation of the steam repeated both inside and outside the sparger continues, a large chugging load occurs in the sparger and discharging line. Such chugging load deteriorates structural integrity of the sparger, and eventually causes damage to the sparger.

In addition, in order to increase a reduction ratio of the radioactive materials discharged into the refueling tank, it is necessary to allow the radioactive materials to come into contact with cooling water as much as possible by making the steam and air discharged through the sparger into small units of bubbles. However, for the related art sparger, the thusly-made bubbles are relatively large in size. This lowers the probability that the radioactive materials in the bubbles come into contact with the cooling water, thereby causing a limitation of radioactive material removal performance.

Accordingly, it may be considered to develop a sparger which is capable of maintaining such bubbles in small size while improving sustained performance of the jet flow of the steam and air discharged through the sparger.

SUMMARY

One aspect of the present disclosure is to provide a sparger capable of maintaining bubbles discharged therethrough in small size while reducing a chugging load occurred as a discharge flow rate of steam and air is reduced, and a nuclear power plant having the same.

In order to achieve these and other advantages and in accordance with the purpose of this specification, as embodied and broadly described herein, there is provided a sparger including a main pipe configured to connect inside and outside of a water tank, the water tank having a storage space therein for storing cooling water, so as to define a flow path through which steam and air containing radioactive materials generated at the outside of the water tank are discharged into the cooling water in the storage space, a header part connected to one end portion of the main pipe located in the storage space, and having a storage chamber in which the steam and air transferred through the main pipe are collected, and a plurality of discharge nozzles each having an inlet and an outlet formed at one end portion located in the storage chamber and another end portion located in the storage space, respectively, to discharge the steam and air from the storage chamber to the storage space, the plurality of discharge nozzles being spaced apart from one another and at least some of the plurality of discharge nozzles protruding from the header part by different lengths.

The plurality of discharge nozzles may protrude from side surfaces of the header part in a manner that lengths thereof protruding from the header part are increased or decreased from top to bottom of the header part.

The plurality of discharge nozzles may be formed to have a shape of steps as the lengths protruding from the header part are increased from the top to bottom of the header part.

The plurality of discharge nozzles may be formed such that a flow path area is decreased from the inlet to the outlet.

The plurality of discharge nozzles may include a first row disposed at a lower portion of the header part, and a second row disposed above the first row, and the first and second rows may be alternately arranged so as not to be placed on a straight line extending from the top to bottom of the header part.

The plurality of discharge nozzles may extend from the inside of the storage chamber into the storage space through the side surfaces of the header part in a direction away from the header part, and may be configured to have the same sum of a length of one end portion extending into the storage chamber and a length of another end portion extending into the storage space, based on the side surfaces of the header part.

The plurality of discharge nozzles may protrude from a first surface and a second surface facing each other, among the side surfaces of the header part, and the discharge nozzles protruding from the first surface and the discharge nozzles protruding from the second surface may be sequentially arranged from the top to bottom of the header part in a spacing manner.

The sparger may further include a branch pipe configured to diverge a flow path defined by the main pipe from the one end portion of the main pipe located in the storage space in a first direction and a second direction different from each other. The header part may include a first branch header and a second branch header connected to one end portion and another end portion of the branch pipe, respectively. The plurality of discharge nozzles may include a plurality of first branch discharge nozzles formed at the first branch header, and a plurality of second branch discharge nozzles formed at the second branch header.

On the other hand, a nuclear power plant according to one embodiment to achieve the one aspect of the present disclosure may include the sparger.

The nuclear power plant may further include a radioactive material removal system configured to reduce concentration of radioactive materials diffused into a containment building upon an accident.

DETAILED DESCRIPTION OF THE PREFERRED EMBODIMENTS

Hereinafter, a sparger and a nuclear power plant having the same according to the present disclosure will be described in detail with reference to the accompanying drawings.

In this specification, the same or similar reference numerals are given to the same or similar configurations even in different embodiments, and the description thereof is replaced with the first description.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Figure 1:
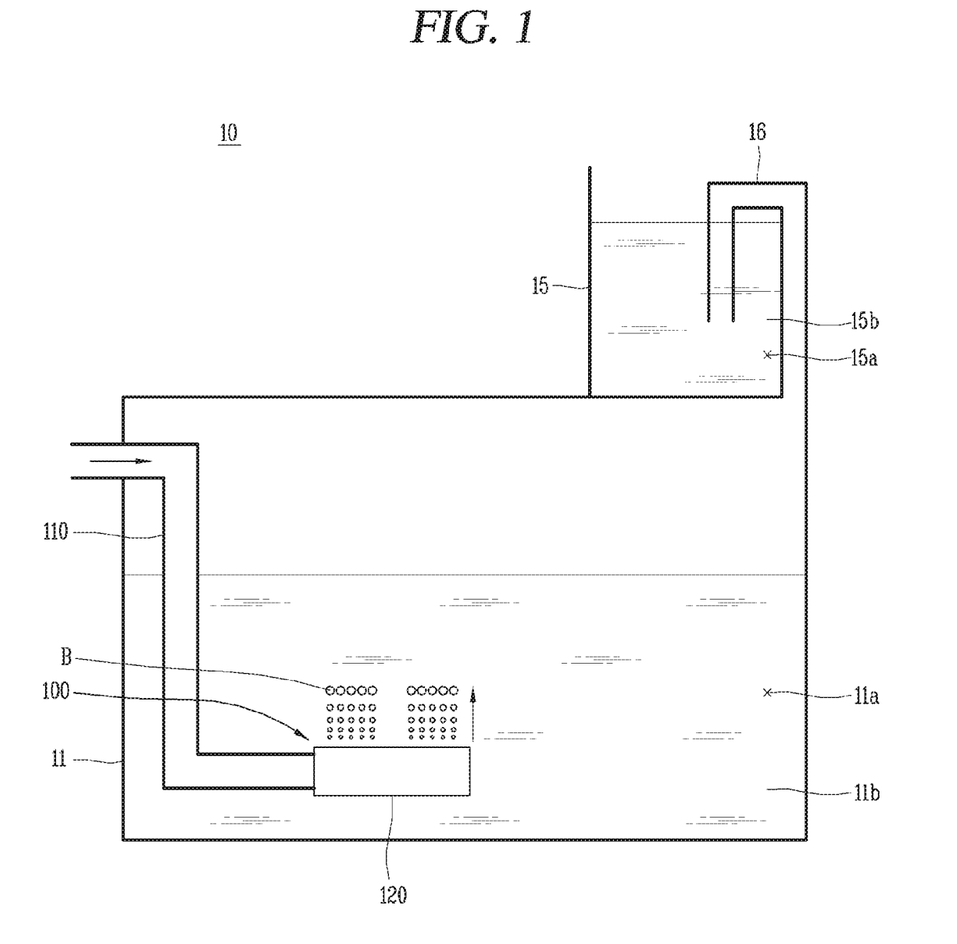
FIG. 1 is a conceptual diagram illustrating a sparger and a radioactive material removal system having the same in accordance with one embodiment of the present disclosure.
Figure 2:
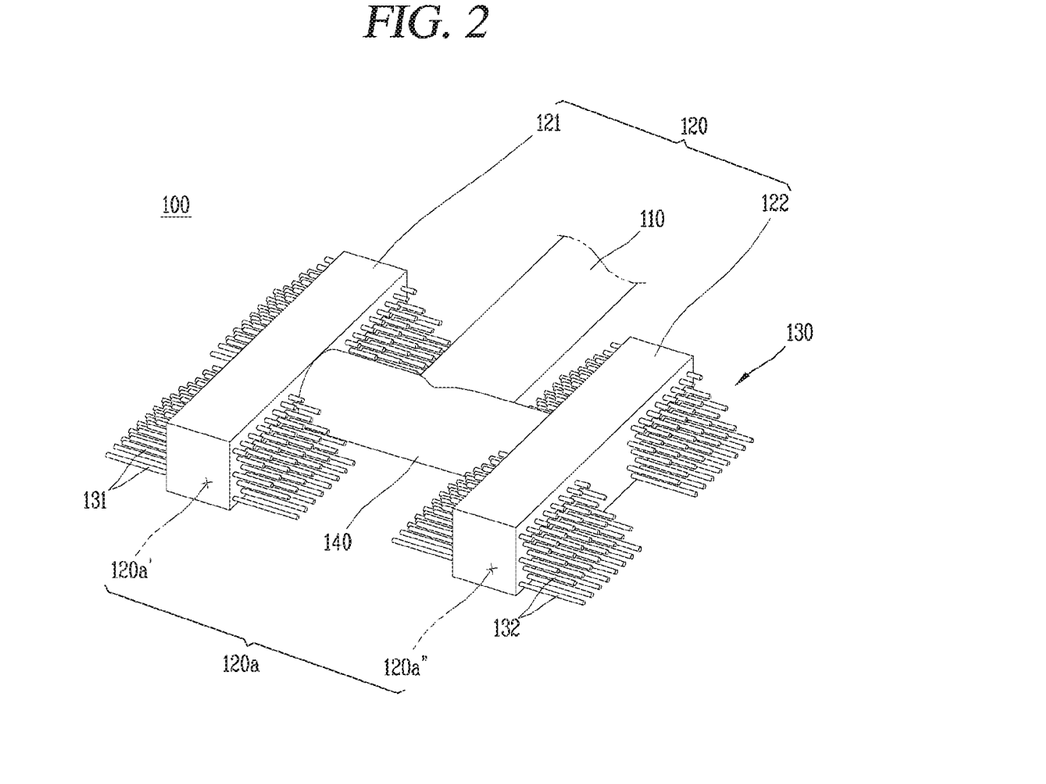
FIG. 2 is a perspective view of the sparger illustrated in FIG. 1.
Figure 3:
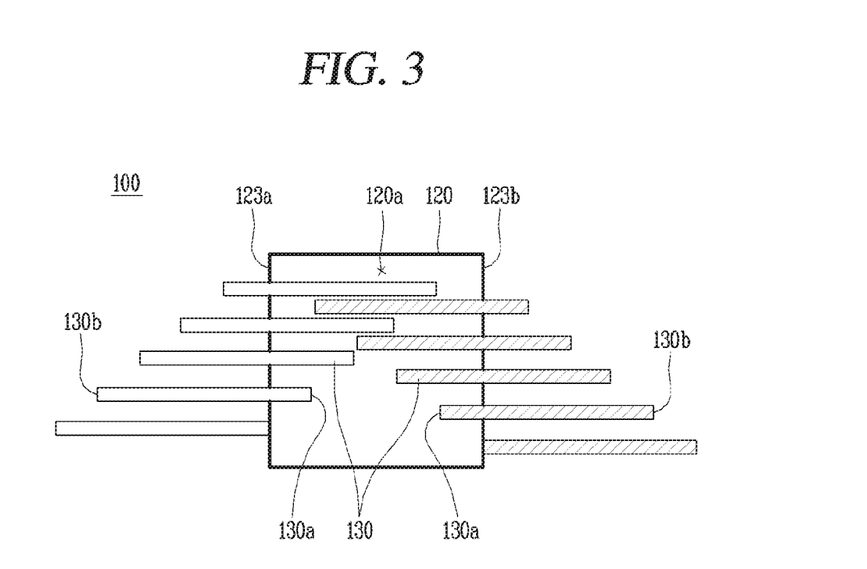
FIG. 3 is a conceptual diagram illustrating a cross-section of the sparger illustrated in FIG. 2.
Figure 4A:
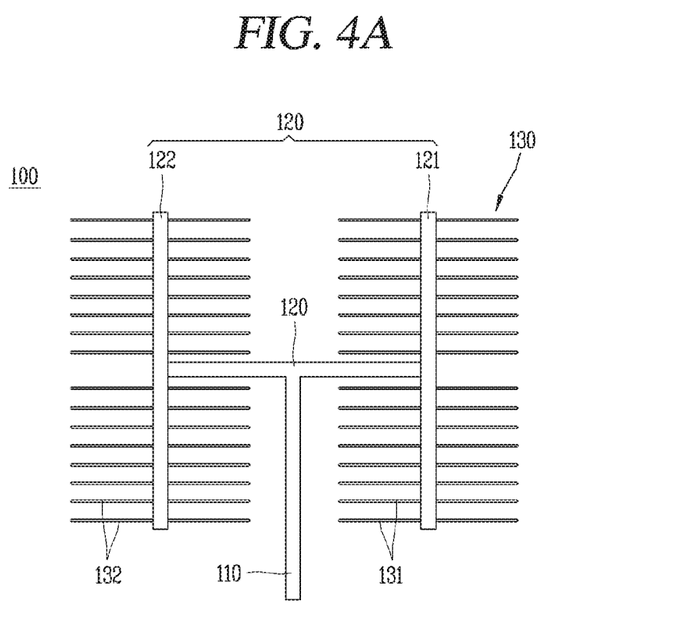
FIG. 4A is a conceptual diagram of the sparger illustrated in FIG. 2, viewed from a horizontal plane.
Figure 4B:
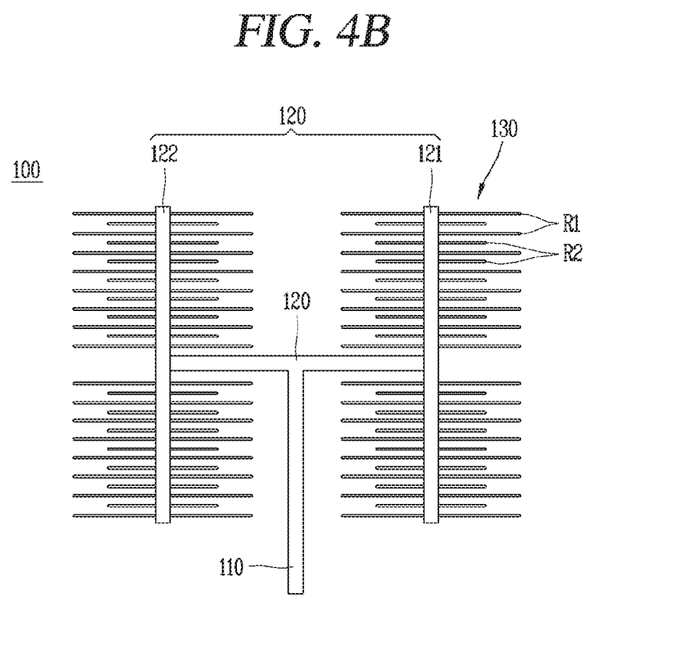
FIG. 4B is a conceptual diagram illustrating another example of the sparger illustrated in FIG. 4A.

FIG. 1 is a conceptual diagram illustrating a sparger 100 and a radioactive material removal system 10 having the same in accordance with one embodiment of the present disclosure, FIG. 2 is a perspective view of the sparger 100 illustrated in FIG. 1, and FIG. 3 is a conceptual view illustrating a cross-section of the sparger 100 illustrated in FIG. 2, FIG. 4A is a conceptual diagram of the sparger 100 illustrated in FIG. 2 viewed from a horizontal plane, and FIG. 4B is a conceptual diagram illustrating another example of the sparger 100 illustrated in FIG. 4A.

Referring to FIGS. 1 to 4B, a nuclear power plant includes a sparger 100. The nuclear power plant may be configured as an integral reactor such as System-integrated Modular Advanced Reactor (SMART). The nuclear power plant includes a radioactive material removal system 10 for lowering concentration of radioactive materials discharged and diffused inside a containment building (not shown) in the event of an accident. The radioactive material removal system 10 includes a sparger 100 for making steam and air containing radioactive materials into small bubbles B and supplying the steam and air in the form of the bubbles B into a water tank 11 storing cooling water 11b. Steam and air discharged to a lower region of the water tank 11 by the sparger 100 are condensed or made into the bubbles B. The bubbles B rise to come in contact with the cooling water 11b stored in a storage space 11a inside the water tank 11. While the bubbles B rise in the cooling water 11b, the radioactive materials contained in the bubbles B are dissolved by the cooling water 11b and removed. The radioactive materials may contain, for example, iodine.

In addition, the radioactive material removal system 10 may further include an auxiliary tank 15 that is provided with a storage space 15a for storing cooling water 15b, and disposed on a top of the water tank 11. With this configuration, the cooling water 11b stored in the water tank 11 and steam and air containing radioactive materials, which have not been primarily removed by the sparger 100, may be resupplied into the auxiliary tank 15 such that the radioactive materials can be secondarily removed.

The inside of the auxiliary tank 15 and the inside of the water tank 11 may be connected by an auxiliary pipe 16 connecting the storage space 11a of the water tank 11 and the inside of the auxiliary tank 15, such that the steam and air containing the radioactive materials can move along the auxiliary pipe 16.

The sparger 100 includes a main pipe 110, a header part 120 and a discharge nozzle 130.

The main pipe 110 connects the outside and the inside of the water tank 11 to define a flow path through which steam and air containing radioactive materials generated from the outside of the water tank 11 are transferred into the cooling water 11b inside the storage space 11a of the water tank 11. The water tank 11 stores the cooling water 11b in its inner storage space 11a. The radioactive materials contained in the steam and air supplied through the discharge nozzle 130 to be explained later are removed by being dissolved in the cooling water 11b.

The header part 120 includes a storage chamber 120a that is connected to one end portion of the main pipe 110 located in the storage space 11a, such that the steam and air transferred through the main pipe 110 can be collected therein.

The discharge nozzle 130 is provided in plurality as illustrated in FIGS. 2 to 4B. Each discharge nozzle 130 is provided with an inlet 130a and an outlet 130b formed at one end portion located in the storage chamber 120a and another end portion located in the storage space 11a, respectively. The inlet 130a and the outlet 130b are preferably formed at the one end portion and the another end portion of the discharge nozzle 130, but are not necessarily limited thereto, and may alternatively be formed at an intermediate portion in a longitudinal (lengthwise) direction of the discharge nozzle 130.

As illustrated in FIG. 3, the discharge nozzles 130 are partially disposed in the storage chamber 120a, and also partially disposed in the storage space 11a. Each of the discharge nozzles 130 extends in a direction away from the header part 120 such that the steam and air in the storage chamber 120a is discharged into the storage space 11a. In addition, the plurality of discharge nozzles 130 is disposed to be spaced apart from one another, and at least some of the discharge nozzles 130 protrude from the header part 120 by different lengths.

The plurality of discharge nozzles 130 may be formed such that a flow path area is reduced (the flow path is narrowed) from the inlet 130a to the outlet 130b. According to the structure of the discharge nozzles 130, the flow path area can be more reduced so as to increase a sustaining force of the jet flow of the steam and air.

According to the structure of the discharge nozzles 130, the steam and air collected in the storage chamber 120a of the header part 120 through the main pipe 110 continuously make the jet flow due to the reduced flow path area while moving sequentially along the header part 120 and the discharge nozzles 130. This phenomenon is achieved through inverse relationship between A and V in Q=A*V relation. Here, Q denotes a flow rate (m$^3$/s), A denotes a cross-sectional area of a pipe (m$^2$), and V denotes an average flow velocity in the pipe (m/s).

Accordingly, even when the flow rate of the steam and air supplied through the main pipe 110 decreases, the jet flow discharged through the discharge nozzles 130 can be maintained. As a result, the phenomenon that the condensation of the steam occurs inside the discharge nozzles 130, other than outside the discharge nozzles 130, due to the decrease of the jet flow, can be prevented, so as to reduce a chugging load due to the condensation occurred inside the discharge nozzles 130. This may result in improving structural integrity of the sparger 100.

On the other hand, the plurality of discharge nozzles 130 may protrude from side surfaces of the header part 120 in a manner that lengths protruding from the header part 120 can be increased or decreased from top to bottom of the header part 120. According to the structure of the discharge nozzles 130, when the outlets 130b of the discharge nozzles 130 are formed at the end portions of the discharge nozzles 130 located in the storage space 11a, the bubbles B can be discharged through the outlets 130b located at different positions in the storage space 11a. This may result in preventing a problem (situation) that the bubbles B discharged into the storage space 11a through the plurality of discharge nozzles 130 interfere and merge with one another while moving upward. In the drawings of the present disclosure, the discharge nozzles 130 are illustrated in the form that their protruded lengths are increased from the top to bottom of the header part 120, on the contrary, the discharge nozzles 130 may be implemented such that their protruded lengths are decreased from the top to bottom of the header part 120. As such, both the two structures of the discharge nozzles 130 contribute to discharging the bubbles B through the outlets 130b at different positions, thereby exhibiting an effect of maintaining the bubbles B in small size.

In addition, the plurality of discharge nozzles 130 can be implemented in the form of steps as they protrude from the side surfaces of the header part 120 in the manner that the lengths protruding from the header part 120 are increased from the top to bottom of the header part 120. The structure of the plurality of discharge nozzles 130 can prevent the bubbles B, which are discharged from the discharge nozzles 130 located at a lower portion of the header part 120, from interfering with the bubbles discharged from other discharge nozzles 130, as well as from interfering with other structures constructing the sparger 120, while rising in water. Accordingly, the bubbles B created through the sparger 120 can rise while maintaining the small bubble size, and a contact between the radioactive materials contained in the bubbles B and the cooling water is increased, compared to bubbles in a large size. In addition, a relatively weak buoyancy is formed by the small bubbles B, and a time for which the bubbles B are staying in the cooling water 11b can increase.

Meanwhile, the plurality of discharge nozzles 130 may include a first row R1 and a second row R2.

The first row R1 is located at a lower portion of the header part 120, that is, to be lower than the second row R2 to be described later based on the header part 120.

The second row R2 is disposed above the first row R1. Here, the first and second rows R1 and R2 are alternately arranged so as not to be placed on a straight line extending from the top to bottom of the header part 120. According to the structure of the first and second rows R1 and R2, as illustrated in FIG. 4B which is a diagram of the sparger 100 viewed from a horizontal plane, the outlets 130b of the discharge nozzles 130 are located at different positions. Therefore, movement paths of the bobbles B rising in the cooling water can differ, which may result in more reducing interference between the bubbles.

On the other hand, the plurality of discharge nozzles 130, as illustrated in FIG. 3, may be configured to have the same sum of a length of one end portion extending into the storage chamber 120a of the header part 120 and a length of another end portion extending into the storage space 11a of the water tank 11. In addition, the plurality of discharge nozzles 130, as illustrated in FIG. 3, may be configured to protrude from a first surface 123a and a second surface 123b facing each other, among side surfaces of the header part 120. Here, the discharge nozzles 130 protruding from the first surface 123a and the discharge nozzles 130 protruding from the second surface 123b may be sequentially arranged from the top to bottom of the header part 120 in a spacing manner.

According to the structure of the plurality of discharge nozzles 130, the discharge nozzles 130 can be formed to have the same length. Accordingly, the steam and air in the storage chamber 120a can be discharged by similar amounts through the plurality of discharge nozzles 130 having the same flow path length, such that the different bubbles B can be brought into contact with the cooling water 11b with a constant probability. For example, when an amount of bubbles B discharged through the discharge nozzles 130 located at the upper portion of the header part 120 is larger than an amount of bubbles B discharged through the discharge nozzles 130 located at the lower portion of the header part 120, the bubbles B discharged through the lower portion of the header part 120 may be brought into contact with the cooling water 11b in which the radioactive materials contained in the bubbles discharged through the upper portion of the header part 120 have already been dissolved much. This may lower the probability that the radioactive materials contained in the bubbles B discharged through the lower portion of the header part 120 are removed. In addition, the plurality of discharge nozzles 130 can be configured to have the same length, thereby reducing the manufacturing cost of the sparger 100.

Meanwhile, as illustrated in FIG. 2, the sparger 100 may further include a branch pipe 140 that diverges the flow path in different first and second directions from the one end portion of the main pipe 110 in the storage space 11a. In addition, the header part 120 may include a first branch header 121 and a second branch header 122 connected to one end portion and another end portion of the branch pipe 140, respectively. The first branch header 121 and the second branch header 122 may define therein a first branch storage chamber 120a' and a second branch storage chamber 120" in which the steam and air transferred through the branch pipe 140 are collected. And, the plurality of discharge nozzles 130 may include a plurality of first branch discharge nozzles 131 formed at the first branch header 121, and a plurality of second branch discharge nozzles formed at the second branch header 122.

Hereinafter, the sparger 100 according to another embodiment of the present disclosure will be described with reference to FIGS. 5 to 7.

Figure 5:
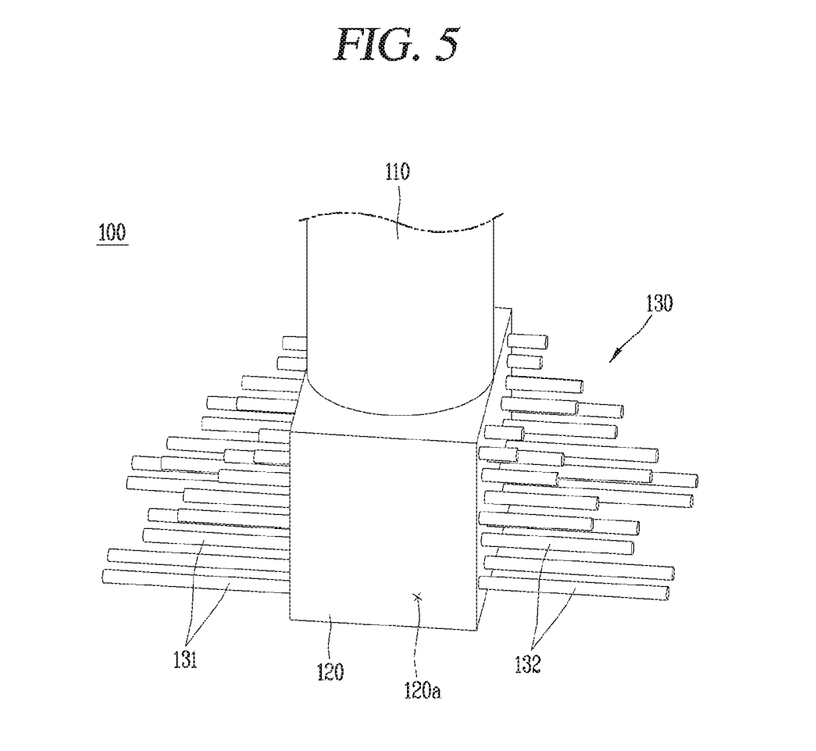
FIG. 5 is a perspective view illustrating another embodiment of the sparger illustrated in FIG. 1.
Figure 6:
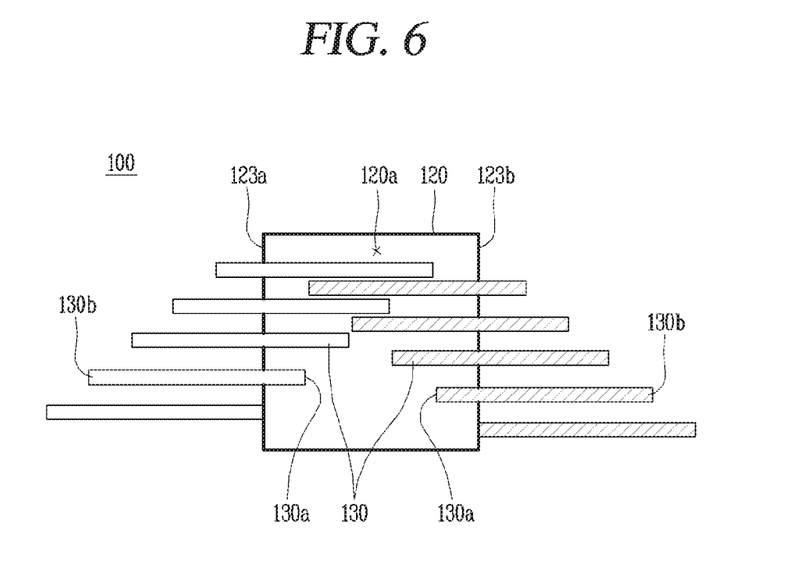
FIG. 6 is a conceptual diagram illustrating a cross-section of the sparger illustrated in FIG. 5.
Figure 7:
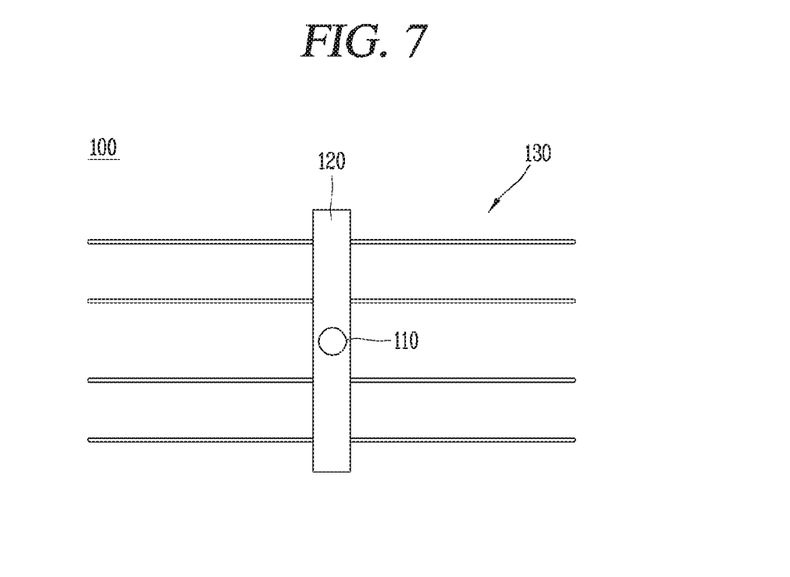
FIG. 7 is a conceptual diagram of the sparger illustrated in FIG. 5, viewed from a horizontal plane.

FIG. 5 is a perspective view illustrating another embodiment of the sparger 100 illustrated in FIG. 1, FIG. 6 is a conceptual diagram illustrating a cross-section of the sparger 100 illustrated in FIG. 5, and FIG. 7 is a conceptual diagram of the sparger illustrated in FIG. 5, viewed from a horizontal plane.

Referring to FIGS. 5 to 7, the sparger 100 does not include the branch pipe 140 described above with reference to FIGS. 1 to 4B. Specifically, one end portion of the main pipe 110 located in the storage space 11a is directly connected to the header 120 without the branch pipe 140. Steam and air containing radioactive materials which are directly supplied into the storage chamber 120a of the header part 120 through the main pipe 110 are made into the bubbles B through the plurality of discharge nozzles 130 that extend away from the header part 120, and then discharged into a lower region of the storage space 11a of the water tank 11.

The plurality of discharge nozzles 130, as illustrated in FIG. 5, may be implemented in the form of steps as the lengths thereof protruding from the header part 120 are increased from the top to bottom of the header part 120. Compared to the sparger 100 described with reference to FIGS. 1 to 4B, the sparger 100 according to the another embodiment has a relatively concise structure having the single header part 120 without the branch pipe 140.

For reference, the other components constituting the sparger 100 illustrated in FIGS. 5 to 7 except for the characteristic not having the branch pipe 140 have the same/like characteristics as those with the same/like reference numerals described with reference to FIGS. 1 to 4B.

According to the present disclosure having the configurations as described above, even when a flow rate of steam and air supplied through the header part and the plurality of discharge nozzles, in which a flow path area is decreased, is reduced, a jet flow discharged through the discharge nozzles can be maintained, thereby preventing condensation of steam inside the sparger. Accordingly, a chugging load due to the condensation occurred inside the sparger can be reduced, thereby remarkably improving structural integrity of the sparger.

In addition, it is possible to prevent a phenomenon in which bubbles discharged through the discharge nozzles interfere and merge with one another to be thereby increased in size. In other words, as the bubbles created through the sparger rise while maintaining a small bubble size, more radioactive materials contained in the bubbles can be brought into contact with cooling water. Also, buoyancy of the bubbles is relatively weak due to the small bubble size, which can extend a time for which the bubbles stay in the cooling water, resulting in remarkably increasing a reduction ratio of the radioactive materials.

The foregoing description is merely exemplary, and various changes and variations may be made by those skilled in the art to which the present disclosure pertains, without departing from the scope and technical idea of the described embodiments. The foregoing embodiments may be implemented individually or in any combination.

What is claimed is:

1. A sparger comprising:
a main pipe configured to connect inside and outside of a water tank, the water tank having a storage space therein for storing cooling water, so as to define a flow path through which steam and air containing radioactive materials generated at the outside of the water tank are discharged into the cooling water in the storage space;
a header part connected to one end portion of the main pipe located in the storage space, and having a storage chamber in which the steam and air transferred through the main pipe are collected;
a plurality of discharge nozzles each having an inlet and an outlet formed at one end portion located in the storage chamber and another end portion located in the storage space, respectively, to discharge the steam and air from the storage chamber to the storage space, the plurality of discharge nozzles being spaced apart from one another and at least some of the plurality of discharge nozzles protruding from the header part by different lengths, and
wherein the plurality of discharge nozzles protrudes from a first surface and a second surface facing each other, among the side surfaces of the header part, and the discharge nozzles protruding from the first surface and the discharge nozzles protruding from the second surface are sequentially arranged from the top to bottom of the header part in a spacing manner.

2. The sparger of claim 1, wherein the plurality of discharge nozzles comprises:
a first row disposed at a lower portion of the header part; and
a second row disposed above the first row, and
wherein the first and second rows are alternately arranged so as not to be placed on a straight line extending from the top to bottom of the header part.

3. The sparger of claim 1, further comprising a branch pipe configured to diverge a flow path defined by the main pipe from the one end portion of the main pipe located in the storage space in a first direction and a second direction different from each other,
wherein the header part comprises a first branch header and a second branch header connected to one end portion and another end portion of the branch pipe, respectively, and
wherein the plurality of discharge nozzles comprises a plurality of first branch discharge nozzles formed at the first branch header, and a plurality of second branch discharge nozzles formed at the second branch header.

4. The sparger of claim 1, wherein the plurality of discharge nozzles protrudes from side surfaces of the header part in a manner that lengths thereof protruding from the header part are increased or decreased from top to bottom of the header part.

5. The sparger of claim 4, wherein the plurality of discharge nozzles is formed to have a shape of steps as the lengths protruding from the header part are increased from the top to bottom of the header part.

6. The sparger of claim 5, wherein the plurality of discharge nozzles is formed such that a flow path area is decreased from the inlet to the outlet.

7. A nuclear power plant having the sparger according to claim 1.

8. The nuclear power plant of claim 7, further comprising a radioactive material removal system configured to reduce concentration of radioactive materials diffused into a containment building upon an accident.

9. A sparger comprising:
a main pipe configured to connect inside and outside of a water tank, the water tank having a storage space therein for storing cooling water, so as to define a flow path through which steam and air containing radioactive materials generated at the outside of the water tank are discharged into the cooling water in the storage space;

a header part connected to one end portion of the main pipe located in the storage space, and having a storage chamber in which the steam and air transferred through the main pipe are collected;

a plurality of discharge nozzles each having an inlet and an outlet formed at one end portion located in the storage chamber and another end portion located in the storage space, respectively, to discharge the steam and air from the storage chamber to the storage space, the plurality of discharge nozzles being spaced apart from one another and at least some of the plurality of discharge nozzles protruding from the header part by different lengths, wherein the plurality of discharge nozzles extends from the inside of the storage chamber into the storage space through the side surfaces of the header part in a direction away from the header part, and is configured to have the same sum of a length of one end portion extending into the storage chamber and a length of another end portion extending into the storage space, based on the side surfaces of the header part.

* * * * *